United States Patent
Huang et al.

(10) Patent No.: US 12,255,677 B2
(45) Date of Patent: Mar. 18, 2025

(54) DETACHABLE ANTENNA AND ELECTRONIC DEVICE

(71) Applicant: ASUSTeK COMPUTER INC., Taipei (TW)

(72) Inventors: Chi-Lun Huang, Taipei (TW); Jung-Huang Chiang, Taipei (TW); Hsiao-Ming Tsai, Taipei (TW); Ten-Long Deng, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 403 days.

(21) Appl. No.: 17/894,145

(22) Filed: Aug. 23, 2022

(65) Prior Publication Data

US 2023/0083981 A1  Mar. 16, 2023

(30) Foreign Application Priority Data

Sep. 14, 2021 (CN) .......................... 202111075539.X

(51) Int. Cl.
*H04B 1/18* (2006.01)
*H05B 45/30* (2020.01)

(52) U.S. Cl.
CPC ............... *H04B 1/18* (2013.01); *H05B 45/30* (2020.01)

(58) Field of Classification Search
CPC .................................. H04B 1/18; H05B 45/30
See application file for complete search history.

(56) References Cited

U.S. PATENT DOCUMENTS

| | | | | |
|---|---|---|---|---|
| 6,804,558 B2 * | 10/2004 | Haller | ...................... | G06F 8/65 |
| | | | | 607/30 |
| 7,181,505 B2 * | 2/2007 | Haller | ...................... | A61N 1/08 |
| | | | | 709/219 |
| 8,500,726 B2 * | 8/2013 | Hancock | ................ | A61B 18/18 |
| | | | | 606/32 |
| 10,291,330 B2 * | 5/2019 | Yuda | ...................... | H04B 10/40 |
| 11,211,964 B1 * | 12/2021 | Chang | ...................... | H04B 1/40 |
| 11,323,176 B2 * | 5/2022 | Vaez-Ghaemi | .... | G01M 11/3109 |
| 11,784,712 B2 * | 10/2023 | Vaez-Ghaemi | ...... | G02B 6/4277 |
| | | | | 398/115 |

(Continued)

FOREIGN PATENT DOCUMENTS

| | | | | |
|---|---|---|---|---|
| CN | 106067956 | | 4/2019 | |
| EP | 1933587 A1 * | | 6/2008 | ......... H04Q 11/0067 |

(Continued)

*Primary Examiner* — Hai V Nguyen
(74) *Attorney, Agent, or Firm* — JCIPRNET

(57) ABSTRACT

A detachable antenna and an electronic device are provided. The detachable antenna includes a connector, an antenna module, and a light-emitting module. The light-emitting module includes a light-emitting unit and a bias circuit. The bias circuit includes an input end, a first output end, and a second output end. The input end of the bias circuit receives a mixed signal from the connector. The mixed signal includes a communication signal and a drive signal. The first output end of the bias circuit outputs the communication signal to the antenna module. The second output end of the bias circuit outputs the drive signal to the light-emitting unit. The detachable antenna of the disclosure is integrated with the light-emitting module and receives the mixed signal from a single input end to implement communication and light emitting functions simultaneously.

20 Claims, 4 Drawing Sheets

(56) References Cited

U.S. PATENT DOCUMENTS

| | | | | |
|---|---|---|---|---|
| 11,917,740 B2* | 2/2024 | Woytowitz | ............. | H05B 45/20 |
| 2002/0013613 A1* | 1/2002 | Haller | ................ | A61N 1/37282 |
| | | | | 607/60 |
| 2002/0052539 A1* | 5/2002 | Haller | ................ | A61N 1/37211 |
| | | | | 600/300 |
| 2002/0082665 A1* | 6/2002 | Haller | ................ | A61N 1/37264 |
| | | | | 607/60 |
| 2010/0145328 A1* | 6/2010 | Hancock | ............ | A61B 18/1815 |
| | | | | 606/33 |
| 2013/0134891 A1* | 5/2013 | Woytowitz | ........... | H05B 47/175 |
| | | | | 315/201 |
| 2013/0249429 A1* | 9/2013 | Woytowitz | ........... | H05B 47/185 |
| | | | | 315/246 |
| 2017/0098897 A1* | 4/2017 | Sharawi | ................... | H01Q 9/40 |
| 2019/0313503 A1* | 10/2019 | Woytowitz | ............. | H05B 45/20 |
| 2020/0116769 A1* | 4/2020 | Craciun | ................... | H01Q 1/32 |
| 2021/0211167 A1* | 7/2021 | Ramasamy | .......... | H04B 7/0608 |
| 2021/0408671 A1* | 12/2021 | Kim | ........................ | H01Q 3/24 |
| 2021/0408685 A1* | 12/2021 | Chang | .................... | H01Q 5/371 |
| 2021/0409088 A1* | 12/2021 | Chang | ................ | H04W 52/288 |
| 2022/0029642 A1* | 1/2022 | Helmboldt | ........... | H04B 1/0003 |
| 2022/0109498 A1* | 4/2022 | Vaez-Ghaemi | ...... | H04B 10/071 |
| 2022/0294528 A1* | 9/2022 | Vaez-Ghaemi | ...... | G02B 6/4277 |
| 2022/0385375 A1* | 12/2022 | Rekhi | ...................... | H04B 5/77 |
| 2023/0074671 A1* | 3/2023 | Woytowitz | ........... | H05B 47/185 |
| 2024/0063900 A1* | 2/2024 | Vaez-Ghaemi | ...... | G02B 6/4284 |

FOREIGN PATENT DOCUMENTS

| | | | | |
|---|---|---|---|---|
| TW | M395265 | 12/2010 | | |
| WO | WO-2018206343 A1 * | 11/2018 | ............ | F21V 23/045 |

* cited by examiner

DETACHABLE ANTENNA AND ELECTRONIC DEVICE

CROSS-REFERENCE TO RELATED APPLICATION

This application claims the priority benefit of Chinese application serial No. 202111075539.X, filed on Sep. 14, 2021. The entirety of the above-mentioned patent application is hereby incorporated by reference herein and made a part of the specification.

BACKGROUND OF THE INVENTION

Field of the Invention

The disclosure relates to a detachable device, and in particular, to a detachable antenna and an electronic device.

Description of the Related Art

Because a detachable antenna includes only a single pin, and a conventional detachable antenna uses the single pin to receive and de-receive a communication signal, a light signal unit is not further disposed on the conventional detachable antenna. In other words, a general light signal unit is only disposed on a non-detachable antenna and uses different signal cables to transmit the communication signal and a drive signal respectively.

BRIEF SUMMARY OF THE INVENTION

According to the first aspect, a detachable antenna is provided. The detachable antenna includes: a connector, an antenna module, and a light-emitting module. The light-emitting module includes a light-emitting unit and a bias circuit. The bias circuit includes an input end, a first output end, and a second output end. The input end of the bias circuit is coupled to the connector. The first output end of the bias circuit is coupled to the antenna module. The second output end of the bias circuit is coupled to the light-emitting unit. The input end of the bias circuit receives a mixed signal from the connector. The mixed signal includes a communication signal and a drive signal. The first output end of the bias circuit outputs the communication signal to the antenna module. The second output end of the bias circuit outputs the drive signal to the light-emitting unit.

According to the second aspect, an electronic device is provided. The electronic includes: a device body and a detachable antenna. The device body includes a signal mixing circuit. The signal mixing circuit is configured to output a mixed signal. The detachable antenna is externally connected to the device body. The detachable antenna includes a connector, an antenna module, and a light-emitting module. The connector is coupled to the signal mixing circuit, and configured to receive the mixed signal. The light-emitting module includes a light-emitting unit and a bias circuit. The bias circuit includes an input end, a first output end, and a second output end. The input end of the bias circuit is coupled to the connector. The first output end of the bias circuit is coupled to the antenna module. The second output end of the bias circuit is coupled to the light-emitting unit. The input end of the bias circuit receives a mixed signal from the connector. The mixed signal includes a communication signal and a drive signal. The first output end of the bias circuit outputs the communication signal to the antenna module. The second output end of the bias circuit outputs the drive signal to the light-emitting unit.

Based on the above, the detachable antenna and the electronic device of the disclosure receive the mixed signal, output the communication signal in the mixed signal to the antenna module via the bias circuit, and output the drive signal in the mixed signal to the light-emitting unit.

In order to make the above features and advantages of the disclosure more comprehensible, embodiments accompanied with figures are described in detail below.

DETAILED DESCRIPTION OF THE EMBODIMENTS

Figure 1:
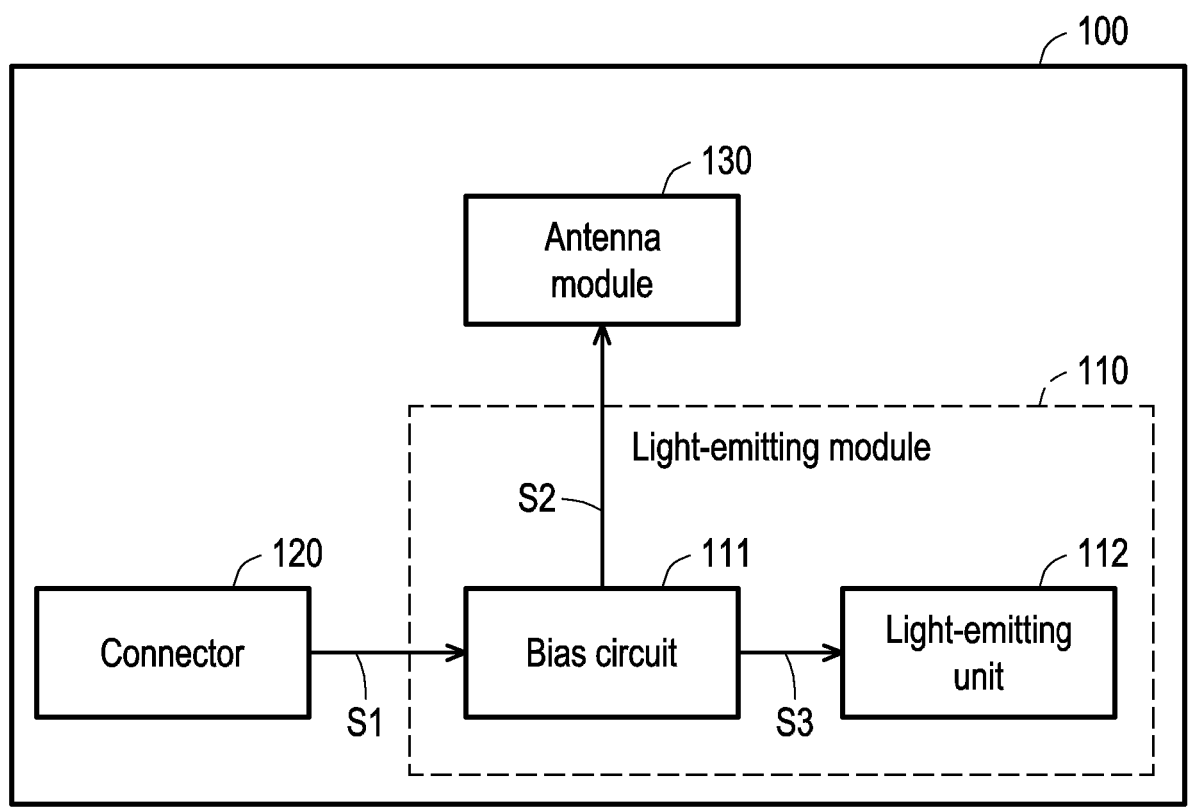
FIG. 1 is a schematic circuit diagram of a detachable antenna according to an embodiment of the disclosure.

Exemplary embodiments of the disclosure are described in detail, and examples of the exemplary embodiments are shown in the accompanying drawings. Whenever possible, the same element symbols are used in the drawings and descriptions to indicate the same or similar parts.

Referring to FIG. 1, a detachable antenna 100 includes a light-emitting module 110, a connector 120, and an antenna module 130. The light-emitting module 110 includes a bias circuit 111 and a light-emitting unit 112 (a light signal unit). The bias circuit 111 includes an input end, a first output end, and a second output end. The input end of the bias circuit 111 is coupled to the connector 120. The first output end of the bias circuit 111 is coupled to the antenna module 130. The second output end of the bias circuit 111 is coupled to the light-emitting unit 112. The input end of the bias circuit 111 receives a mixed signal S1 from the connector 120. The mixed signal S1 includes a communication signal S2 and a drive signal S3. It is worth noting that, the bias circuit 111 of this embodiment is, in an embodiment, a bias Tee circuit. The connector 120 of this embodiment is a sub miniature version A (SMA) connector. The light-emitting module 110 of this embodiment is a light-emitting diode (LED) light board. The light-emitting unit 112 of this embodiment includes one or more LEDs. The antenna module 130 of this embodiment includes a copper tube antenna.

In this embodiment, the detachable antenna 100 is adapted to be mounted on a device body of an electronic device to provide communication and light emitting functions. The detachable antenna 100 is electrically connected to a circuit board in the device body of the electronic device through the connector 120 to receive the mixed signal S1 from a single pin of the connector 120. In this embodiment, the bias circuit 111 outputs the communication signal S2 and the drive signal S3 in the mixed signal S1 to the antenna module 130 and the light-emitting unit 112 respectively, so that the antenna module 130 transmits a wireless signal according to the communication signal S2, and the light-emitting unit 112 is illuminated according to the drive signal S3. Therefore, the detachable antenna 100 of this embodiment uses the single pin to receive the mixed signal S1, and performs the communication and light emitting functions simultaneously.

In this embodiment, the communication signal S2 is an analog signal, and the drive signal S3 is a digital signal. In an embodiment, the communication signal S2 is a radio frequency (RF) signal with 2.4 GHz or 5 GHz, and the drive signal S3 is a direct current voltage signal (less than 60 mA) with 3.3 V.

Figure 2:
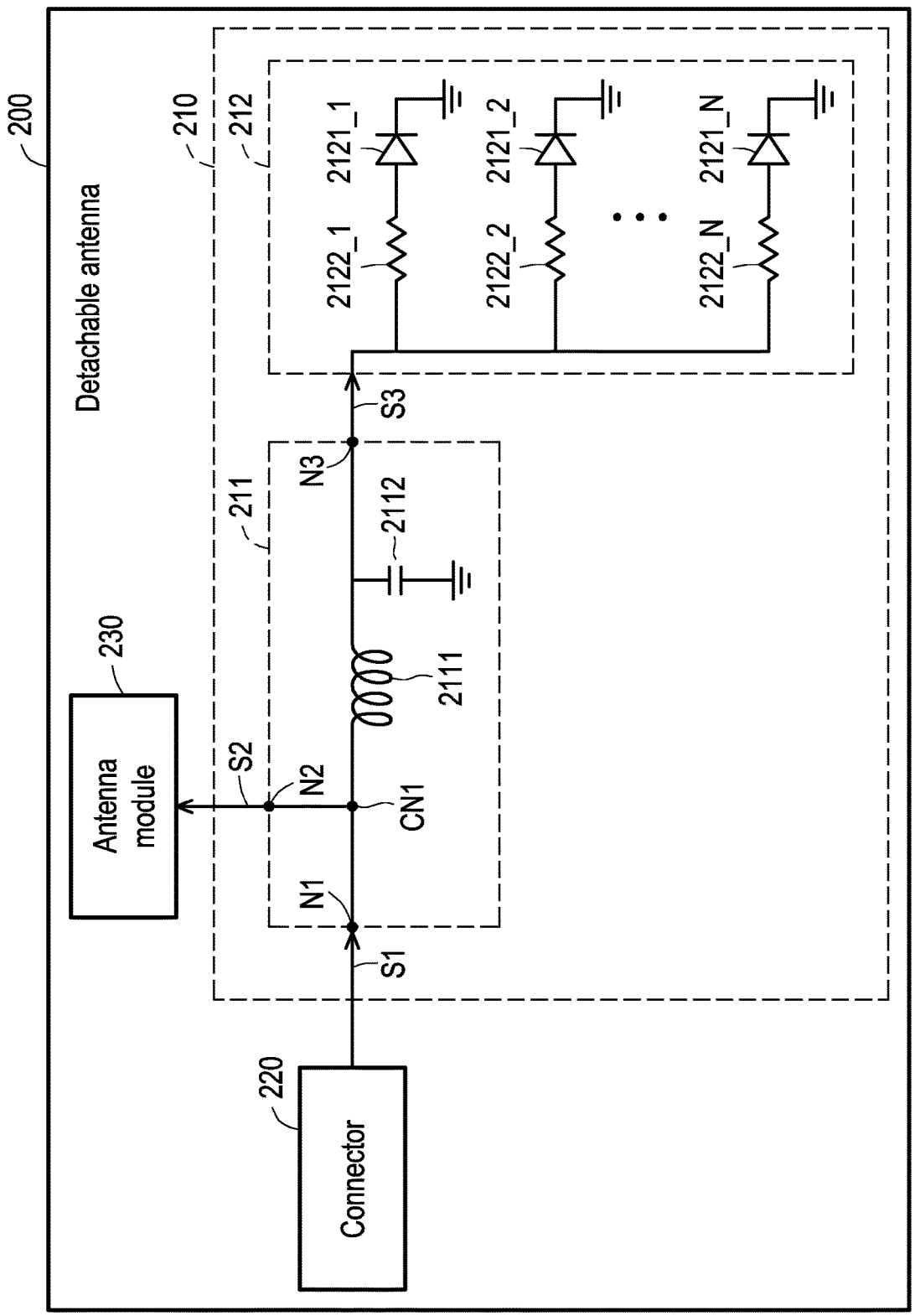
FIG. 2 is a schematic circuit diagram of a detachable antenna according to another embodiment of the disclosure.

Referring to FIG. 2, a detachable antenna 200 includes a light-emitting module 210, a connector 220, and an antenna module 230. The light-emitting module 210 includes a bias circuit 211 and a light-emitting unit 212. The bias circuit 211 includes an input end N1, an output end N2, and an output end N3, and includes a circuit node CN1, an inductor 2111, and a capacitor 2112. An inductance of the inductor 2111 is, in an embodiment, 27 nH. A capacitance of the capacitor 2112 is, in an embodiment, 10 pF. In this embodiment, the circuit node CN1 is coupled to the input end N1, the output end N2, and the output end N3. One end and the other end of the inductor 2111 are respectively coupled between the circuit node CN1 and the output end N3. One end and the other end of the capacitor 2112 are respectively coupled between the output end N3 and a ground end (a ground voltage). In this way, when the detachable antenna 200 is mounted on an electronic device, the connector 220 receives a mixed signal S1 provided by the electronic device. The mixed signal S1 includes a communication signal S2 and a drive signal S3. The mixed signal S1 is inputted to the bias circuit 211 via the input end N1, and flows through the circuit node CN1. The mixed signal S1 is outputted to the antenna module 230 via the output end N2, so that the antenna module 230 implements a communication function according to the communication signal S2 in the mixed signal S1.

It is worth noting that, because the communication signal S2 is an analog signal, and the drive signal S3 is a digital signal, the drive signal S3 in the mixed signal S1 does not affect an antenna function of the antenna module 230. However, in an embodiment, the bias circuit 211 also includes another capacitor coupled between the circuit node CN1 and the output end N2 to block the drive signal S3 from being transmitted to the antenna module 230 via the output end N2. In an embodiment, one end of the another capacitor is coupled to the circuit node CN1, and the other end of the another capacitor is coupled to the output end N2.

In this embodiment, the communication signal S2 being the analog signal in the mixed signal S1 is blocked by the inductor 2111, so that only the drive signal S3 being the digital signal in the mixed signal S1 passes through the inductor 2111, and the capacitor 2112 filters out signal noise of the drive signal S3. Therefore, the output end N3 of the bias circuit 211 outputs the drive signal S3 to the light-emitting unit 212. In this embodiment, the light-emitting unit 212 includes a plurality of LEDs 2121_1 to 2121_N and a plurality of resistors 2122_1 to 2122_N, where N is a positive integer. One end and the other end of the resistors 2122_1 to 2122_N are respectively coupled between the output end N3 and respective first ends of the LEDs 2121_1 to 2121_N. Second ends of the LEDs 2121_1 to 2121_N are respectively coupled to the ground end. Resistances of the resistors 2122_1 to 2122_N are, in an embodiment, 330 OHM respectively.

In this embodiment, the drive signal S3 drives the LEDs 2121_1 to 2121_N to implement a light emitting function. The light emitting function of the LEDs 2121_1 to 2121_N is used for, in an embodiment, providing a light signal indicating related indication information such as a light signal indicating a current communication state. In addition, for other technical features of the detachable antenna 200 of this embodiment, refer to the description of the detachable antenna 100 of the embodiment of FIG. 1, and so on. Therefore, the detachable antenna 200 of this embodiment uses a single pin to receive the mixed signal S1, and performs the communication and light emitting functions simultaneously.

Figure 3:
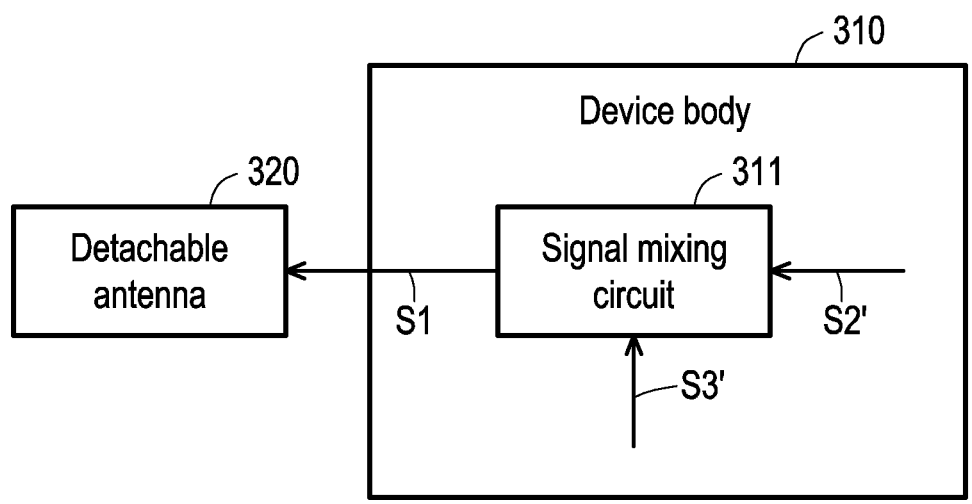
FIG. 3 is a schematic circuit diagram of an electronic device according to an embodiment of the disclosure.

Referring to FIG. 3, an electronic device 300 includes a device body 310 and a detachable antenna 320, where the detachable antenna 320 of this embodiment is, in an embodiment, the detachable antenna 100 of FIG. 1 or the detachable antenna 200 of FIG. 2 described above. In this embodiment, the device body 310 includes a signal mixing circuit 311. The signal mixing circuit 311 is configured to output a mixed signal S1 to the detachable antenna 320. In this embodiment, the signal mixing circuit 311 receives a communication signal S2' used for being provided to the antenna module of the detachable antenna 320 and a drive signal S3' used for driving a light-emitting unit of the detachable antenna 320, and mixes the communication signal S2' and the drive signal S3' to output the mixed signal S1, where for signal characteristics of the communication signal S2' and the drive signal S3', refer to the description of the embodiments of FIG. 1 and FIG. 2 described above, and details are not repeated herein.

In this embodiment, the device body 310 of the electronic device 300 is, in an embodiment, a router device. The device body 310 of the electronic device 300 further includes a communication signal generating circuit or a related communication interface for generating the communication signal S2', and includes a related light-emitting drive circuit or a controller for generating the drive signal S3' driving an LED. The device body 310 of the electronic device 300 further includes a connector, so that the connector of the detachable antenna 320 is substantially integrated with the connector of the device body 310, and the detachable antenna 320 is selectively detached from the device body 310. In this embodiment, the detachable antenna 320 is mounted on the device body 310, and the detachable antenna 320 receives the mixed signal S1 outputted by the signal mixing circuit 311 in the device body 310 through a single pin of the connector.

Figure 4:
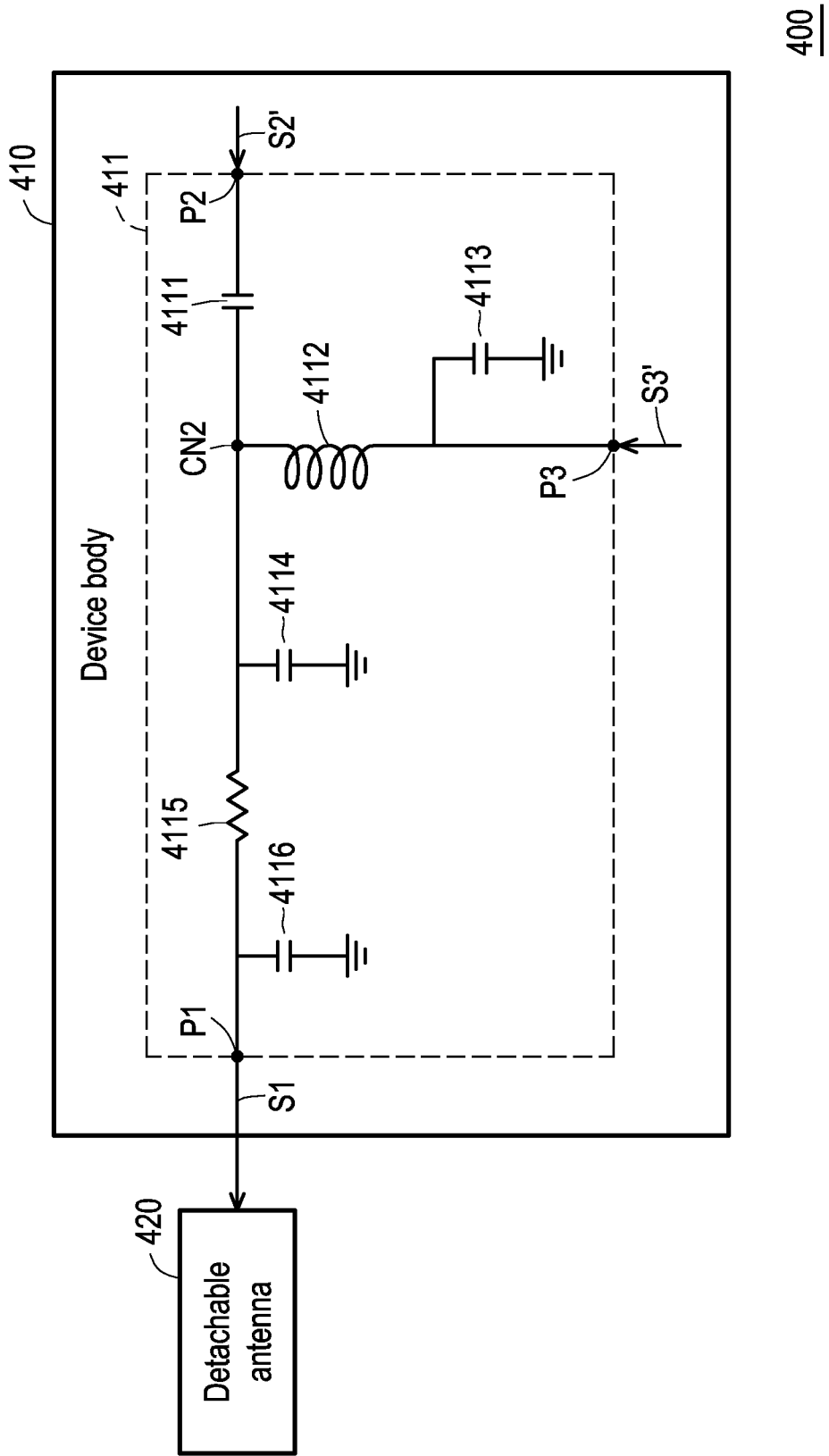
FIG. 4 is a schematic circuit diagram of an electronic device according to another embodiment of the disclosure.

Referring to FIG. 4, an electronic device 400 includes a device body 410 and a detachable antenna 420, where the detachable antenna 420 of this embodiment is, in an embodiment, the detachable antenna 100 of FIGS. 1 and 200 or the detachable antenna of FIG. 2 described above. In this embodiment, the device body 410 includes a signal mixing circuit 411. The signal mixing circuit 411 includes a circuit node CN2, an output end P1, an input end P2, and an input end P3. The circuit node CN2 is coupled to the output end P1, the input end P2, and the input end P3. In this embodiment, the signal mixing circuit 411 includes capacitors 4111 and 4113 and an inductor 4112. One end and the other end of the capacitor 4111 are respectively coupled between the input end P2 and the circuit node CN2. One end and the other end of the inductor 4112 are respectively coupled between the input end P3 and the circuit node CN2. One end and the other end of the capacitor 4113 are respectively coupled between the input end P3 and the ground end. In this embodiment, the signal mixing circuit 411 receives a communication signal S2' from the input end P2, and receives a drive signal S3' from the input end P3. A capacitance of the capacitor 4111 is, in an embodiment, 6.8 pF. An inductance of the inductor 4112 is, in an embodiment, 13 nH. A capacitance of the capacitor 4113 is, in an embodiment, 10 pF.

In this embodiment, the capacitor 4111 blocks the drive signal S3' from flowing to the input end P2. The inductor 4112 blocks the communication signal S2' from flowing to the input end P3. The capacitor 4113 filters out signal noise of the drive signal S3'. The communication signal S2' and the drive signal S3' are integrated into a mixed signal S1 at the circuit node CN2, and the mixed signal S1 is outputted to the detachable antenna 420 via the output end P1 of the signal mixing circuit 411. Therefore, when the detachable antenna 420 of this embodiment is mounted on the device body 410, the mixed signal S1 provided by the signal mixing circuit 411 of the device body 410 is received through a single pin of the connector, so that the electronic device 400 implements communication and light emitting functions through the detachable antenna 420. In addition, with regard to other technical features and implementations of the device body 410 and the detachable antenna 420 of this embodiment, refer to the description of the embodiments of FIG. 1 to FIG. 3 to obtain sufficient teachings, suggestions, and implementation descriptions. Therefore, details are not repeated herein.

In addition, the signal mixing circuit 411 of this embodiment further includes capacitors 4114 and 4116 and a resistor 4115. One end and the other end of the capacitor 4114 are respectively coupled between the circuit node CN2 and the ground end. One end of the resistor 4115 is coupled to the circuit node CN2 and the capacitor 4114, and the other end of the resistor 4115 is coupled to the output end P1 of the signal mixing circuit 411. One end and the other end of the capacitor 4114 are respectively coupled between the other end of the resistor 4115 and a ground end. A capacitance of the capacitor 4114 is, in an embodiment, 6.8 pF. A capacitance of the capacitor 4116 is, in an embodiment, 0.3 pF.

In summary, in the detachable antenna and the electronic device of the disclosure, the detachable antenna receives the mixed signal outputted by the circuit in the device body of the electronic device through the single pin, and outputs the communication signal and the drive signal in the mixed signal to the antenna module and the light-emitting unit respectively via the bias circuit in the detachable antenna, to implement the communication and light emitting functions simultaneously.

Finally, it should be noted that the foregoing embodiments are merely used for describing the technical solutions of the disclosure, but are not intended to limit the disclosure. Although the disclosure is described in detail with reference to the foregoing embodiments, it should be appreciated by a person skilled in the art that, modifications may still be made to the technical solutions recorded in the foregoing embodiments, or equivalent replacements may be made to the part of all of the technical features; and these modifications or replacements will not cause the essence of corresponding technical solutions to depart from the scope of the technical solutions in the embodiments of the disclosure.

What is claimed is:

1. A detachable antenna, comprising:
    a connector;
    an antenna module; and
    a light-emitting module, comprising:
        a light-emitting unit; and
        a bias circuit, comprising an input end, a first output end, and a second output end, wherein the input end of the bias circuit is coupled to the connector, the first output end of the bias circuit is coupled to the antenna module, and the second output end of the bias circuit is coupled to the light-emitting unit;
    the input end of the bias circuit receives a mixed signal from the connector, and the mixed signal comprises a communication signal and a drive signal; and
    the first output end of the bias circuit outputs the communication signal to the antenna module, and the second output end of the bias circuit outputs the drive signal to the light-emitting unit.

2. The detachable antenna according to claim 1, wherein the communication signal is an analog signal, and the drive signal is a digital signal.

3. The detachable antenna according to claim 1, wherein the communication signal is a radio frequency (RF) signal, and the drive signal is a direct current voltage signal.

4. The detachable antenna according to claim 1, wherein the bias circuit comprises:
    a first circuit node, coupled to the input end, the first output end, and the second output end; and
    a first inductor, coupled between the first circuit node and the second output end.

5. The detachable antenna according to claim 4, wherein the bias circuit further comprises:
    a first capacitor, coupled between the second output end and a ground end.

6. The detachable antenna according to claim 4, wherein the bias circuit further comprises:
    a second capacitor, coupled between the first circuit node and the first output end.

7. The detachable antenna according to claim 1, wherein the light-emitting unit further comprises:
    a light-emitting diode (LED); and
    a first resistor, coupled between the second output end and the LED.

8. The detachable antenna according to claim 1, wherein the antenna module comprises a copper tube antenna.

9. The detachable antenna according to claim 1, wherein the connector is a sub miniature version A (SMA) connector.

10. An electronic device, comprising:
    a device body, comprising a signal mixing circuit, wherein the signal mixing circuit is configured to output a mixed signal; and
    a detachable antenna, externally connected to the device body, and comprising:
        a connector, coupled to the signal mixing circuit, and configured to receive the mixed signal;
        an antenna module; and
        a light-emitting module, comprising:
            a light-emitting unit; and
            a bias circuit, comprising an input end, a first output end, and a second output end, wherein the input end of the bias circuit is coupled to the connector, the first output end of the bias circuit is coupled to the antenna module, and the second output end of the bias circuit is coupled to the light-emitting unit;
    the input end of the bias circuit receives the mixed signal from the connector, and the mixed signal comprises a communication signal and a drive signal; and
    the first output end of the bias circuit outputs the communication signal to the antenna module, and the second output end of the bias circuit outputs the drive signal to the light-emitting unit.

11. The electronic device according to claim 10, wherein the communication signal is an analog signal, and the drive signal is a digital signal.

12. The electronic device according to claim 10, wherein the communication signal is an RF signal, and the drive signal is a direct current voltage signal.

13. The electronic device according to claim 10, wherein the bias circuit comprises:
 a first circuit node, coupled to the input end, the first output end, and the second output end; and
 a first inductor, coupled between the circuit node and the second output end.

14. The electronic device according to claim 13, wherein the bias circuit further comprises:
 a first capacitor, coupled between the second output end and a ground end.

15. The electronic device according to claim 13, wherein the bias circuit further comprises:
 a second capacitor, coupled between the first circuit node and the first output end.

16. The electronic device of claim 10, wherein the light-emitting unit further comprises:
 an LED; and
 a first resistor, coupled between the second output end and the LED.

17. The electronic device according to claim 10, wherein the antenna module comprises a copper tube antenna.

18. The electronic device according to claim 10, wherein the connector is an SMA connector.

19. The electronic device according to claim 10, wherein the signal mixing circuit comprises a second circuit node, a first input end, a second input end, and an output end, and the second circuit node is coupled to the first input end, the second input end, and the output end; and
 the first input end of the signal mixing circuit receives the communication signal, the second input end of the signal mixing circuit receives the drive signal, and the output end of the signal mixing circuit outputs the mixed signal.

20. The electronic device according to claim 19, wherein the signal mixing circuit comprises:
 a third capacitor, coupled between the first input end and the second circuit node;
 a second inductor, coupled between the second input end and the second circuit node; and
 a fourth capacitor, coupled between the second input end and a ground end.

\* \* \* \* \*